United States Patent
Levenstein et al.

(10) Patent No.: US 11,163,577 B2
(45) Date of Patent: Nov. 2, 2021

(54) SELECTIVELY SUPPORTING STATIC BRANCH PREDICTION SETTINGS ONLY IN ASSOCIATION WITH PROCESSOR-DESIGNATED TYPES OF INSTRUCTIONS

(71) Applicant: INTERNATIONAL BUSINESS MACHINES CORPORATION, Armonk, NY (US)

(72) Inventors: Sheldon Levenstein, Austin, TX (US); Brian W. Thompto, Austin, TX (US); David S. Levitan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 16/200,191

(22) Filed: Nov. 26, 2018

(65) Prior Publication Data
US 2020/0167163 A1   May 28, 2020

(51) Int. Cl.
*G06F 9/30* (2018.01)
*G06F 9/38* (2018.01)

(52) U.S. Cl.
CPC ........ *G06F 9/3848* (2013.01); *G06F 9/30058* (2013.01); *G06F 9/30181* (2013.01);
(Continued)

(58) Field of Classification Search
CPC .. G06F 9/3846; G06F 9/3848; G06F 9/30058; G06F 9/30181
See application file for complete search history.

(56) References Cited

U.S. PATENT DOCUMENTS 5,367,703 A   11/1994   Levitan
5,515,519 A * 5/1996   Yoshioka ................ G06F 8/447
                                                      712/234
(Continued)

FOREIGN PATENT DOCUMENTS

EP   0805390 A1   6/1997
GB   2283595 A   10/1995

OTHER PUBLICATIONS

Jonathan Rentzsch, "Save your code from meltdown using PowerPC atomic instructions", Nov. 2, 2004 (Year: 2004).*
(Continued)

*Primary Examiner* — William B Partridge
*Assistant Examiner* — Kasim Alli
(74) *Attorney, Agent, or Firm* — Robert C. Bunker

(57) ABSTRACT

A processor reads at least one instruction comprising at least one of a branch instruction and a non-branch instruction. In response to the branch instruction comprising a conditional branch instruction and set in dynamic mode, the processor dynamically predicts a branch path as taken or not taken. The processor, in response to the instruction fetch unit set in static mode for a conditional branch instruction and static branch prediction setting bits received with the conditional branch instruction specifying static branch prediction, statically sets the branch path as taken or not taken according to the static branch prediction setting bits received with the branch instruction. The processor selectively sets the operation of the processor temporarily from the dynamic mode to the static mode only in response to detecting a type of the at least one instruction matches a type of instruction qualifying to trigger static branch prediction.

17 Claims, 7 Drawing Sheets

| PROGRAMMABLE STATIC BRANCH PREDICTION BIT SETTINGS 202 | | |
|---|---|---|
| 210 — A | BRANCH SHOULD BE STATICALLY PREDICTED 212 | |
| 214 — T | INDICATES IF THE STATICALLY PREDICTED BRANCH SHOULD BE PREDICTED AS "TAKEN" 216 | |

| BRANCH DIRECTION CONTROL BITS 302 | | | |
|---|---|---|---|
| | | BIT 1 316 | BIT 2 318 |
| UNCONDITIONAL BRANCH 304 | DYNAMIC MODE 306 | 1 | X |
| | STATIC MODE 308 | 1 | X |
| CONDITIONAL BRANCH 310 | DYNAMIC MODE 312 | 0 | 1 |
| | STATIC MODE 314 | A AND T | NOT A |

(52) U.S. Cl.
CPC .......... *G06F 9/3802* (2013.01); *G06F 9/3818* (2013.01); *G06F 9/3846* (2013.01)

(56) References Cited

U.S. PATENT DOCUMENTS

| | | | |
|---|---|---|---|
| 5,758,143 A | 5/1998 | Levitan | |
| 5,761,490 A * | 6/1998 | Hunt | G06F 9/3804 |
| | | | 712/213 |
| 6,115,809 A * | 9/2000 | Mattson, Jr. | G06F 8/445 |
| | | | 712/239 |
| 6,247,122 B1 | 6/2001 | Henry et al. | |
| 6,353,882 B1 | 3/2002 | Hunt | |
| 6,502,188 B1 | 12/2002 | Zuraski, Jr. et al. | |
| 6,571,331 B2 * | 5/2003 | Henry | G06F 9/3846 |
| | | | 712/234 |
| 6,651,162 B1 | 11/2003 | Levitan et al. | |
| 6,662,360 B1 | 12/2003 | Hay et al. | |
| 7,404,070 B1 | 7/2008 | Patil et al. | |
| 7,487,334 B2 | 2/2009 | Konisburg et al. | |
| 7,523,298 B2 | 4/2009 | Gschwind | |
| 7,865,705 B2 | 1/2011 | Levitan et al. | |
| 8,694,759 B2 | 4/2014 | Dundas et al. | |
| 8,954,946 B2 | 2/2015 | Jin et al. | |
| 9,122,486 B2 | 9/2015 | Venkumahanti et al. | |
| 9,542,162 B2 | 1/2017 | Gazzillo et al. | |
| 2005/0278513 A1 | 12/2005 | Aristodemou et al. | |
| 2007/0061554 A1 | 3/2007 | Worrell | |
| 2008/0072024 A1 * | 3/2008 | Davis | G06F 9/3848 |
| | | | 712/239 |

OTHER PUBLICATIONS

Definition of reset, Oxford Dictionary, retrieved Jan. 6, 2021, <https://www.lexico.com/en/definition/reset> (Year: 2020).*
Fu et al.; "A Study of the Performance Potential for Dynamic Instruction Hints Selection", ACSAC 2006, pp. 67-80, 2006, 14 pages.
Burguiere et al.; "A Case for Static Branch Prediction in Real-Time Systems", Sep. 2005, 11th IEEE International Conferene on Embedded and Real-time Computing Systems and Applications, 2005, 6 pages.
Mohammadi et al.; "On-Demand Dynamic Branch Prediction", published in IEEE Computer Architecture Letters ( vol. 14, Issue: 1, Jan.-Jun. 1, 2015, Sep. 12, 2013, 10 pages.
The IBM Power8 Processor Core Microarchitecture, IBM DeveloperWorks AIX Virtual User Group, Feb. 28, 2016, 126 pages.

* cited by examiner

| CONSISTENCY CHECK 502 | | | | | | |
|---|---|---|---|---|---|---|
| CONDITIONAL BRANCH 504 | STATE BIT 506 | BIT 1 508 | BIT 2 510 | A BIT 512 | RESULT 514 | |
| | 0 | 0 | 1 | X | CONSISTENT | 520 |
| | 0 | 1 | X | X | INCONSISTENT | 522 |
| | 0 | 0 | 0 | X | INCONSISTENT | 524 |
| | 1 | X | 0 | X | CONSISTENT | 526 |
| | 1 | 0 | 1 | 0 | CONSISTENT | 528 |
| | 1 | 0 | 1 | 1 | INCONSISTENT | 530 |
| | 1 | 1 | 1 | X | INCONSISTENT | 532 |

SELECTIVELY SUPPORTING STATIC BRANCH PREDICTION SETTINGS ONLY IN ASSOCIATION WITH PROCESSOR-DESIGNATED TYPES OF INSTRUCTIONS

BACKGROUND

1. Technical Field

This invention relates in general to computing systems and more particularly to selectively supporting static branch prediction settings only in association with processor-designated types of instructions.

2. Description of the Related Art

Many high performance processors implement pipelines to improve performance. A pipeline includes multiple units, which during a cycle, each partially process an instruction, feed the results to a next stage in the pipeline, and then start working on the next instruction. When instructions are processed in sequential order, a processor pipeline is more likely to process instructions in an efficient manner, however, when a conditional branch instruction is encountered in a pipeline, the likelihood of inefficiency increases. The instruction sequence after the conditional branch instruction will either follow a sequential path and continue to a next instruction or follow a branch path, depending on the result of the branching condition in the conditional branch instruction. In many processors, the branching condition is not resolved until the execution stage of the pipeline. Many processors, in response to receiving a conditional branch instruction, rather than wait until the branch condition is resolved in the execution stage of the pipeline, include branch prediction logic to select either the sequential path or the branch path and follow the selected path until the branch condition is resolved. If branch prediction logic incorrectly predicts a path, then additional operations are required to correct the incorrect prediction throughout the pipeline and reprocess the conditional branch instruction, which causes bottlenecks and performance losses in a processor.

BRIEF SUMMARY

In another embodiment, a processor comprises a branch prediction mechanism a processor reading at least one instruction from a memory subsystem, the at least one instruction comprising one of a branch instruction and a non-branch instruction, the at least one instruction initially received by an instruction fetch unit of the processor with static branch prediction setting bits with a primary bit indicating whether a branch should be statically predicted and a secondary bit indicating whether to predict static branch prediction as taking a branch path from among two paths of the branch, wherein a pre-decode unit of the instruction fetch unit recodes the branch instruction with branch direction control bits, wherein the pre-decode unit recodes the branch direction control bits based on the static branch prediction setting bits only in response to an instruction fetch unit of the processor set to operate in static mode. The processor comprises the branch prediction mechanism, in response to the instruction fetch unit set to operate in dynamic mode and the branch instruction comprising a conditional branch instruction, dynamically predicting a branch path as taken or not taken from among two paths of the branch instruction based on the branch direction control bits set for the dynamic mode. The processor comprises the branch prediction mechanism, in response to the instruction fetch unit set to operate in static mode, the branch instruction comprising the conditional branch instruction, and a second bit of the branch direction control bits set to specify static prediction based on the primary bit, statically setting the branch path as taken or not taken according to a first bit of the branch direction control bits set based on the primary bit and the secondary bit of the static branch prediction setting bits. The processor comprises the branch prediction mechanism selectively setting the operation of the processor temporarily from the dynamic mode to the static mode only in response to detecting a type of the at least one instruction matches a type of instruction qualifying to trigger static branch prediction.

In one embodiment, a processor comprises an instruction fetch unit of a plurality of functional units of a processor. The processor comprises a pre-decode unit of the instruction fetch unit reading at least one instruction from a memory subsystem, the at least one instruction comprising static branch prediction setting bits comprising a primary bit indicating whether a branch should be statically predicted and a secondary bit indicating whether to predict the static branch prediction as taking a branch path from among two paths of a conditional branch instruction. The processor comprises the pre-decode unit selectively recoding each at least one instruction, wherein selectively recoding each at least one instruction comprising a branch instruction comprises adding branch direction control bits specifying handling of the branch instruction by a branch prediction unit of the instruction fetch unit. The processor comprises, in response to the pre-decode unit operating in a dynamic mode from among a static mode and a dynamic mode and the branch instruction comprising the conditional branch instruction, the pre-decode unit selectively recoding the branch direction control bits for the conditional branch instruction by setting a first bit of the branch direction control bits to indicate to not predict a branch always taken from among two paths of the conditional branch instruction and setting a second bit of the branch direction control bits to indicate the branch is designated for dynamic prediction. The processor comprises in response to the pre-decode unit operating in the static mode and the branch instruction comprising the conditional branch instruction, the pre-decode unit selectively recoding the branch direction control bits for the conditional branch instruction according to the static branch prediction setting bits received with the branch instruction by performing a logical AND operation on the primary bit and the secondary bit, setting the first bit of the branch direction control bits to a first result of the logical AND operation, performing a logical NOT operation on the primary bit, and setting the second bit of the branch direction control bits to a second result of the logical NOT operation. The processor comprises selective branch prediction logic of the instruction fetch unit selectively setting an operation of the processor temporarily from the dynamic mode to the static mode, only in response to fetching the at least one instruction and detecting a type of the recoded instruction matches a type of instruction qualifying to trigger static branch prediction.

In another embodiment, a method is directed to reading, by a pre-decode unit of an instruction fetch unit of a plurality of functional units of a processor, at least one instruction from a memory subsystem, the at least one instruction comprising static branch prediction setting bits comprising a primary bit indicating whether a branch should be statically predicted and a secondary bit indicating whether to predict the static branch prediction as taking a branch path from among two paths of a conditional branch instruction. The method is directed to selectively recoding, by the pre-decode unit, each at least one instruction, wherein selectively recoding each at least one instruction comprising a branch instruction comprises adding branch direction control bits specifying handling of the branch instruction by a branch prediction unit of the instruction fetch unit. The method is directed to, in response to the pre-decode unit operating in a dynamic mode from among a static mode and a dynamic mode and the branch instruction comprising the conditional branch instruction, selectively recoding, by the pre-decode unit, the branch direction control bits for the conditional branch instruction by setting a first bit of the branch direction control bits to indicate to not predict a branch always taken from among two paths of the conditional branch instruction and setting a second bit of the branch direction control bits to indicate the branch is designated for dynamic prediction. The method is directed to in response to the pre-decode unit operating in the static mode and the branch instruction comprising the conditional branch instruction, selectively recoding, by the pre-decode unit, the branch direction control bits for the conditional branch instruction according to the static branch prediction setting bits received with the branch instruction by performing a logical AND operation on the primary bit and the secondary bit, setting the first bit of the branch direction control bits to a first result of the logical AND operation, performing a logical NOT operation on the primary bit, and setting the second bit of the branch direction control bits to a second result of the logical NOT operation. The method is directed to selectively setting, by selective branch prediction logic of the instruction fetch unit, an operation of the processor temporarily from the dynamic mode to the static mode, only in response to fetching the at least one instruction and detecting a type of the recoded instruction matches a type of instruction qualifying to trigger static branch prediction.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figures 1, 2, 3:
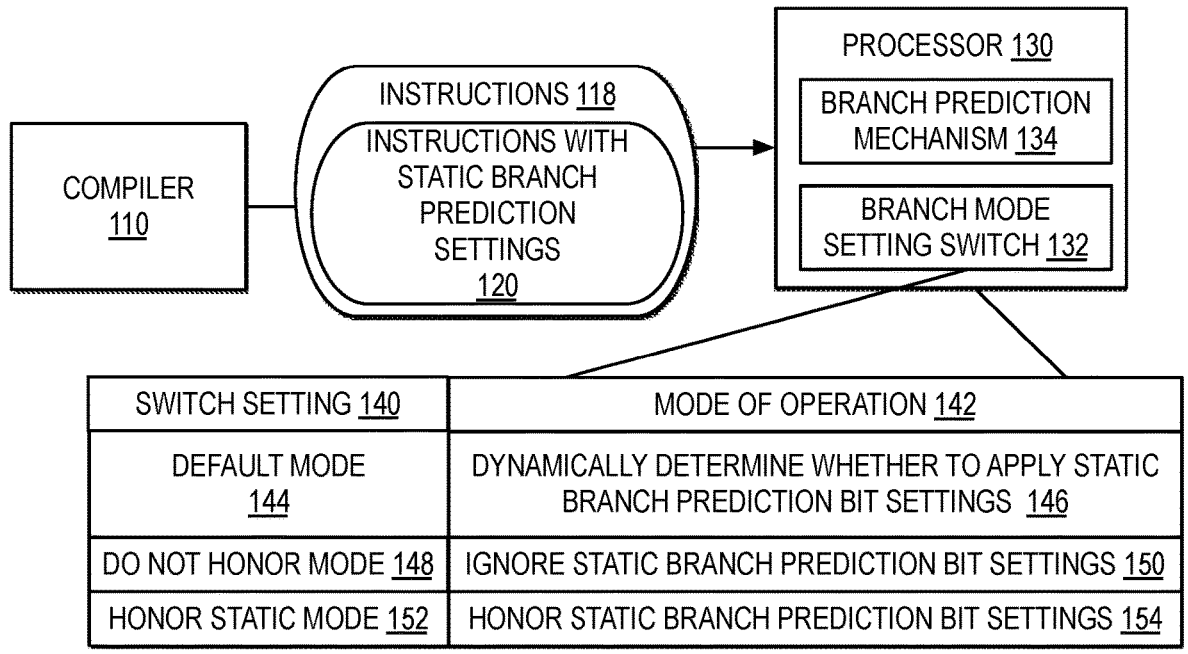
FIG. 1 is a block diagram illustrating one example of a processor that selectively supports application of static branch prediction settings based on a selected branch mode under which the processor is operating.
FIG. 2 is a block diagram illustrating one example of one or more programmable static branch predict bit setting types.
FIG. 3 is a block diagram illustrating one example of branch direction control bits that are set by a pre-decode unit of a branch prediction mechanism of a processor that supports selectively determining whether to apply static branch direction control bits received with instructions.

FIG. 1 illustrates a block diagram of one example of a processor that selectively supports application of static branch prediction settings based on a selected branch mode under which the processor is operating.

In one example, a compiler 110 is an example of one compiler from among one or more types of compilers that compile code into instructions for operation on one or more processors, such as processor 130. In one example, compiler 110 compiles code into one or more types of instructions 118, including instructions with static branch prediction settings 120.

In one example, processor 130 may generally process instructions 118 received from compiler 110 in a sequential order, through a pipeline, however, if a branch instruction is received, processor 130 includes a branch prediction mechanism 134 to manage branch instructions. For example, a branch instruction may represent an unconditional branch instruction, which always branches from the sequential path to an address specified by a branch target label. In another example, a branch instruction may represent a conditional branch instruction that includes an if-then-else condition, which may or may not cause branching from the sequential path to a target path depending on the outcome of a branch condition specified in the branch instruction. For example, conditional branch instructions may represent instructions with a target location to branch to subject to a condition such as, but not limited to, branch on equal, branch on greater than or equal to zero, branch on greater than zero, branch on less than or equal to zero, branch on less than zero, branch on not equal.

In one example, branch prediction mechanism 134 manages the selection of a branch address path for conditional branch instructions by a unit of the pipeline in processor 130 prior to resolving the condition by the execution stage of the pipeline. In the example, branch prediction mechanism 134 supports multiple prediction schemes for selecting the branch path, either selecting "not taken" and continuing with the next sequential instruction or selecting "taken" and branching to another path location. In one example, branch prediction mechanism 134 supports a prediction scheme of dynamic branch prediction, in which the predicted output of a branch instruction may dynamically change during execution, based on one or more factors monitored and analyzed by a branch prediction unit during operation. In another example, branch prediction mechanism 134 supports a prediction scheme of static prediction, through which the outcome of the condition of the branch instruction is predicted by a programmer and incorporated by compiler 110 or predicted by compiler 110, according to a selection of programmable static branch prediction settings in instructions with static branch prediction settings 120 of either "not taken" or "taken", and the selection does not change during execution by processor 130.

In one example, one reason that a programmer or compiler 110 may select that static branch prediction should be applied for a conditional branch instruction is if the programmer predicts the branch is very likely to be "taken" or "not taken" and the programmer or compiler 110 thinks static branch prediction will provide a better prediction for the branch instruction than the hardware dynamic branch prediction performed by branch prediction mechanism 134. In addition, in one example, another reason a programmer or compiler 110 may select that static prediction should be applied for a branch instruction is if the programmer prefers that a portion of code not be executed speculatively and therefore codes a static branch prediction setting so that the code will not be speculatively executed until the branch flushes.

For example, processor 130 supports load word and reserve index (lwarx) and store word conditioned indexed (stwcx) instructions, which may be programmed into a loop with a conditional branch instruction, where the programmer may prefer that the stwcx instruction not execute speculatively. For example, a programmer may use a lwarx/stwcx loop for a fetch and store operation that atomically loads and replaces a word in storage. In another example, a programmer may use a lwarx/stwcx loop for a compare and swap operation that atomically compares a value in a register with a word in storage.

In one example, processor 130 manages lwarx and stwcx instructions through a reservation, which if it exists, ensures that no other processor or mechanism has modified the target memory location between the time the lwarx instruction is executed and the time the stwcx instruction completes. For example, a lwarx instruction loads a word from a location in storage into a target register and creates a reservation on the memory location for use by a subsequent stwcx. When lwarx and stwcx are programmed into a loop, a "bne-loop" command may be inserted after the stwcx instruction, where if the reservation created by the lwarx instruction is still reserved when the stwcx instruction executes, then the stwcx stores the new value from the target register, otherwise if the reservation is lost, the storage is not altered and the conditional branch instruction branches back to the first instruction in the loop.

In one example, while branch prediction mechanism 134 supports handling a programmer selection that a branch should be statically predicted through programmable static branch prediction settings set in instruction with static branch prediction settings 120, in general processor 130 operates more efficiently when branch prediction is performed through dynamic branch prediction by branch prediction mechanism 134, when compared with performance when branch prediction is performed through static branch prediction by branch prediction mechanism 134. In particular, given the option to insert static branch prediction settings into code, a programmer may include the static branch prediction settings, but the results of processor 130 executing the code honoring the static branch prediction settings versus executing the code not honoring the static branch prediction settings and instead running dynamic branch prediction, yields results indicating the dynamic branch prediction is significantly more efficient. In the example, however, turning off handling of static branch predictions settings by processor 130, while improving performance for most instructions, may also negatively impact performance and reliability of certain types of instructions, such as, but not limited to, lwarx/stwcx loops.

In the example, according to an advantage of the invention, processor 130 is configured with a branch mode setting switch 132, which selectively determines the mode in which branch prediction mechanism 134 of processor 130 handles instructions with static branch instructions settings 120. In one example, a switch setting 140 illustrates three types of switch settings that may be set in branch mode setting 132 for controlling how branch prediction mechanism 134 handles static branch prediction settings within instructions with static branch prediction settings 120.

In the embodiment illustrated in FIG. 1, branch mode setting switch 132 includes a switch setting 140 set to one of three settings, illustrated as a default mode 144, a do not honor mode 148, and an honor static mode 152. In another embodiment, switch setting 140 may include additional or alternate settings.

In the example, each setting of switch setting 140 triggers an associated mode of operation 142 within processor 130. In the example, default mode 144 triggers a mode of operation illustrated at reference numeral 146 of dynamically determining whether to apply static branch prediction settings. In the example, do not honor mode 148 triggers a mode of operation illustrated at reference numeral 148 of ignoring static branch prediction settings. In the example, honor static mode 152 triggers a mode of operation illustrated at reference numeral 154 of always honoring static branch prediction settings.

In the example, according to an advantage of the invention, when branch mode setting 132 is set to default mode 144, if branch prediction mechanism 134 detects an instruction that is a processor-designated type of instruction, branch prediction mechanism 134 will dynamically detect and honor any static branch prediction settings received with conditional branch instructions associated with the processor designated type of instruction for a period of time, however, if a conditional branch instruction is received with a static branch prediction setting that is not associated with a processor-designated type of instruction, the static branch prediction setting is not honored. In one example, a processor-designated type of instruction represents a type of instruction, which when detected, would benefit from not being speculatively executed, such as a stwcx instruction within a lwarx loop including a branch instruction. In addition, a processor-designated type of instruction may include a special no-operation (no-op) type of command designated for use by a programmer as a processor-designated type of instruction. By running in default mode 144, branch prediction mechanism 134 may ignore static branch prediction settings in branch instructions set by programmers or compilers that will likely degrade performance if followed, but still honor static branch prediction settings for branch instructions associated with processor-designated types of instructions, such as the lwarx instruction or the special no-op type of operation.

FIG. 2 illustrates a block diagram of one example of one or more programmable static branch predict bit setting types.

In the embodiment illustrated in FIG. 2, branch instructions with static branch prediction settings 120 may include static branch prediction settings of a type illustrated by programmable static branch prediction bit settings 202. In the example, programmable static branch prediction bit settings 202 are illustrated by bit settings of an "A" bit 210 and a "T" bit 212. In one example, if "A" bit 210 is set, the setting indicates an instruction to the processor whether a branch determined by branch prediction mechanism 130 should be statically predicted, as illustrated at reference numeral 212. In one example, if "T" bit 214 is set, the setting indicates an instruction to the processor whether the statically predicted branch should be predicted as "taken", as illustrated at reference numeral 216.

In one example, programmable static branch prediction bit settings 202 may represent instruction hints which may use a small number of available bits in an instruction encoding to allow programmers and compiler 110 to convey suggestions to processor 130. In one example, as instruction hints, programmable static branch prediction bit settings 202 are not new instructions, do not compromise binary compatibility, and may be ignored if processor 130 does not support static branch prediction for an instruction with programmable static branch prediction bit settings 202.

In one example, programmable static branch prediction bit settings 202 may be included in a multiple bit field inside a conditional branch instruction, such as within a BO field of a B-form instruction format for a conditional branch instruction in the PowerPC® (PowerPC is a registered trademark of International Business Machines Corporation) architecture. In one example, an unconditional branch instruction may be formatted in an I-form instruction format, which includes selections of bits for an opcode, an absolute or relative branch address, and absolute address bit, and a link bit, for example, in contrast to a conditional branch instruction formatted in the B-form instruction format, which includes selections of bits for an opcode, options for how the bit is test, whether and how the condition register is involved, the BO field, the bit in the condition register to test, an absolute or relative address, an addressing mode, and a link bit.

FIG. 3 illustrates a block diagram of one example of branch direction control bits that are set by a pre-decode unit of a branch prediction mechanism of a processor that supports selectively determining whether to apply static branch prediction bit settings received with instructions.

In the example, a pre-decode unit or other upstream unit of branch prediction mechanism 134 determines and sets a selection of branch direction control bits 302 related to branch prediction as part of a pre-decode of each instruction processed by the processor. In one example, a bit 1 316 and a bit 2 318 of branch direction control bits 302 are set by an upstream unit in a processor flow in order to assist downstream logic to execute in a streamlined way. In one example, branch prediction mechanism 134 selects what values to specify in branch direction control bits 302 based on an whether a branch instruction is coded as an unconditional branch or as a conditional branch and based on an operation mode of either a dynamic mode or a static mode. In one example, bit 1 316, when set to "1", indicates a branch always predicted taken. If the branch is unconditional, then a branch always predicted taken cannot be incorrectly predicted, so the branch always predicted taken is always set by setting bit 1 316 to "1". In contrast, if the branch is conditional, even though the branch may be predicted as taken, the branch condition may resolve as not taken.

In the example, if branch prediction mechanism 134 receives a branch instruction that is coded as an unconditional branch 304, and if branch prediction mechanism 134 is operating in dynamic mode 310 when setting branch direction control bits 302, as part of a pre-decode of the instruction, bit 1 316 is set to "1" and bit 2 318 can be set to any bit setting. In the example, if branch prediction mechanism 134 receives a branch instruction that is coded as an unconditional branch 304, if branch prediction mechanism 134 is operating in static mode 308 when setting branch direction control bits 302, as part of a pre-decode of the instruction, bit 1 316 is set to "1" and bit 2 318 can be set to any bit setting. In the example, for a branch instruction coded as unconditional branch 304, bit 2 318 may be any bit setting because if bit 1 316 is set to "1" for unconditional branch 304, the branch is handled downstream as a branch always taken and since the branch is unconditional, the branch always predicted taken is always a correct prediction.

In the example, if branch prediction mechanism 134 receives a branch instruction that is coded as a conditional branch 310, and if branch prediction mechanism 134 is operating in dynamic mode 312 when setting branch direction control bits 302, as part of a pre-decode of the instruction, bit 1 316 is set to "0" and bit 2 318 is set to "1". In the example, for a branch instruction coded as conditional branch 310, in dynamic mode 312, by setting bit 1 316 to "0" the bit indicates handling the branch downstream as triggering dynamic branch prediction and bit 2 318 set to "1" indicates branch direction control bits 302 were set for dynamic branch prediction.

In the example, if branch prediction mechanism 134 receives a branch instruction that is coded as a conditional branch 310, and if branch prediction mechanism 134 is operating in static mode 314 when setting branch direction control bits 302, as part of a pre-decode of the instruction, bit 1 316 is set to the value of "A AND T", from the values of "A" and "T" in programmable static branch prediction bit settings 202, and bit 2 318 is set to "NOT A". In the example, bit 1 316 is only set to "1" if both A and T are both set to "1". In the example, for a branch instruction coded as conditional branch 310, in static mode 314, by setting bit 1 316 to "A AND T", bit 1 316 indicates whether to take or not take the branch, and bit 2 318 set to "NOT A" indicates whether the "A" bit was set in a programmable static branch prediction bit setting for an instruction.

In the example, by sharing branch direction control bits 302 for unconditional branch instructions and conditional branch instructions, and for conditional branch instructions, between dynamic mode 310 and static mode 320, the bits are used for highly optimized branch prediction logic, requiring only minimal logic for branch prediction mechanism 134. In one example, processor 130 may simultaneously support multiple threads, such that by minimizing logic requirements for branch prediction mechanism 134, the logic requirements for branch management are also minimized across multiple threads.

Figure 4:
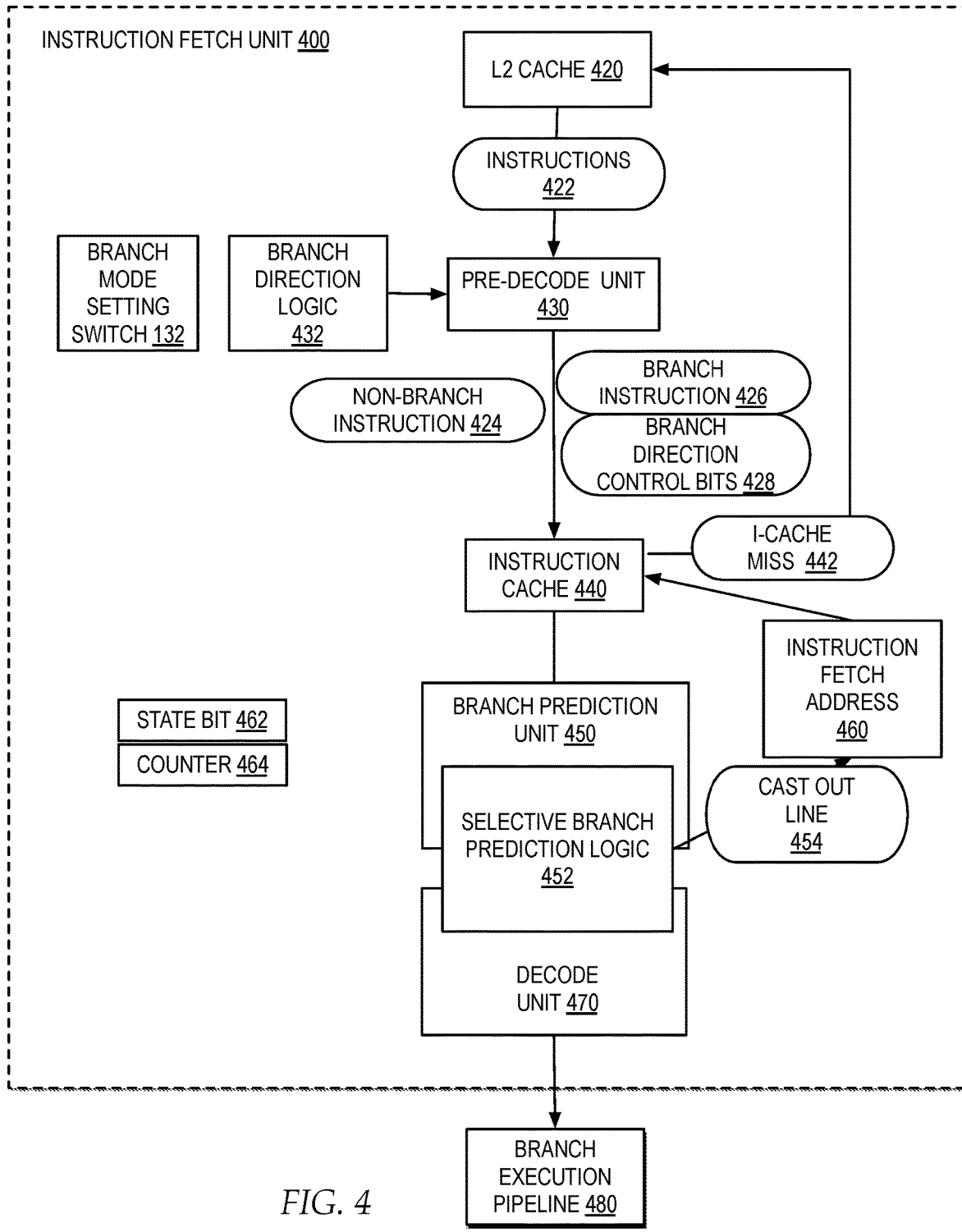
FIG. 4 is a block diagram illustrating one example of an instruction fetch unit of a processor for handling branch instruction fetching and distribution to a branch execution pipeline, where the instruction fetch unit selectively supports application of static branch prediction settings based on the branch mode setting selected during operation.

FIG. 4 illustrates a block diagram of one example of an instruction fetch unit of a processor for handling branch instruction fetching and distribution to a branch execution pipeline, where the instruction fetch unit selectively supports application of static branch prediction settings based on the branch mode setting selected during operation.

In one example, an instruction fetch unit (IFU) 400 represents one of multiple functional units of processor 130. In another embodiment, processor 130 may include multiple instructions fetch units and includes one or more additional units such as, but not limited to, one or more instruction sequencing units (ISUs), one or more load-store units (LSUs), one or more fixed-point units (FXUs), one or more vector and scalar units (VSUs), and one or more decimal floating point units (DFUs).

In one example, IFU 400 includes an instruction cache (I-cache) 440, such as a 32 KB I-cache and an LSU may contain a data cache (D-cache), such as a 64 KB D-cache, which are both backed up by a tightly integrated L2 cache 420, such as a 512 KB L2 cache. L2 cache 420 may be part of a memory hierarchy including one or more levels of memory subsystem and may be coupled to one or more translation lookaside buffers. In one example, in a given cycle, IFU 400 fetches multiple instructions, such as up to 8 instructions, and decode and dispatch multiple instructions, such as up to 8 instructions, to one of multiple execution pipelines. In the embodiment, an execution pipeline shared by all threads for branch instructions is illustrated branch execution pipeline 480, and, processor 130 may include additional branch execution pipelines, along with other types of pipelines including, but not limited to, fixed-point pipelines, load/store pipelines, load pipelines, double-precision floating-point pipelines, symmetric vector pipelines, cryptographic pipelines, condition register logical pipeline, and decimal floating-point pipelines.

In one example, IFU 400 manages feeding the rest of the instruction pipeline in processor 130 with the most likely stream of instructions from each active hardware thread. In one example, IFU 400 applies branch prediction mechanism 134 through logic and bit settings integrated throughout the flow of instructions within IFU 400 to produce the stream of instructions ahead of the point of execution of the latest committed instruction. In particular, in one example, in addition to executing branch instructions, IFU 400 may perform additional, tailored instruction management such as, but not limited to, maintaining a balance of instruction execution rates from active threads using software-specified thread priorities and decoding and forming groups of instructions for the rest of the instruction pipeline.

In one example, IFU 400 may apply the highly optimized branch prediction logic of branch prediction mechanism 134 through the logic in branch mode setting switch 132, branch direction logic 432, branch direction control bits 428, selective branch prediction logic 452, a state bit 462, and a counter 464, distributed throughout the instruction stream. In additional or alternate examples, branch prediction mechanism 134 may include additional or alternate logic within IFU 400 for enabling a mode of operation in IFU 400 to selectively support static branch prediction settings only in association with processor-designated types of instructions.

In one example, IFU 400 evaluates instructions 422, fetched from L2 cache 420, in a pre-decode unit 430, through branch mode setting switch 132 and branch direction bit logic 432. In the example, each read request for instructions from L2 cache 420 may return four sectors of 32 bytes each. The read requests for instructions from L2 cache may either be demand loads that result from I-cache misses in I-cache 440 or instruction pre-fetches. For each demand load request, a pre-fetch engine may initiate additional pre-fetches for sequential cache lines following the demand load. In one example, demand load requests and pre-fetch requests may be made for all instruction threads, of multiple instructions threads operating simultaneously, but independently, and instructions may return from L2 cache 420 to pre-decode unit 430 in any order, including interleaving of sectors for different cache lines.

In the example, instructions are pre-decoded by pre-decode unit 430 before being loaded into I-cache 440. During pre-decoding, pre-decode unit 330 may receive an instruction line with multiple types of instructions, including non-branch and branch instructions, such as a larwx loop. During pre-decoding, pre-decode unit 330 detects and recodes non-branch instructions as non-branch instruction 424. During pre-decoding, pre-decode unit 330 detects and recodes branch instructions so that unconditional or conditional branch prediction instruction coding is inserted into the recoded branch instruction 426 with additional branch direction control bits 302, illustrated as branch direction control bits 428, which assist the downstream units of the processor in streamlined execution of the branch instruction. In the example, during pre-decoding, if pre-decode unit 430 detects a branch instruction, branch direction logic 432 determines whether to set branch direction control bits 428, for an unconditional or conditional branch, while in dynamic mode or static mode, based on a setting in branch mode setting switch 132 in combination with a setting in state bit 462 and counter 464.

In the example, if branch mode setting switch 132 is set to do not honor mode 148, branch direction logic 432 automatically operates in dynamic mode and sets branch direction control bits 428 to "1x" for an unconditional branch instruction and "01" for a conditional branch instruction, regardless of whether any branch instruction includes any static branch prediction bit settings. In contrast, in the example, if branch mode setting switch 132 is set to honor static mode 152, then if a conditional branch instruction includes programmable static branch prediction bit settings with the "A" bit set to "1", branch direction logic 432 sets bit 1 316 of branch direction control bits 428 to the logical AND of the "A" and "T" bits from programmable static branch prediction bit settings and sets bit 2 318 of branch direction control bits 428 to "NOT A", otherwise, branch direction logic 432 sets branch direction control bits 428 to "01".

In the example, according to an advantage of the invention, if branch mode setting switch 132 is set to default mode 144, branch direction logic 432 defaults to operating in dynamic mode, however, if state bit 462 is set and counter 464 has a count value remaining, then branch direction logic 422 operates in static mode. In the example, if branch direction logic 432 is operating in dynamic mode because state bit 462 is not set, then branch direction logic 432 sets branch direction control bits 428 to "1×" for an unconditional branch instruction and "01" for a conditional branch instruction, regardless of whether the branch instruction includes any static branch prediction bit settings. In the example, if branch direction logic 432 is operating in static mode because state bit 462 is set, then branch direction logic 432 sets branch direction control bits 428 to "1×" for an unconditional branch instruction and "A AND T" and "NOT A" for a conditional branch instruction, where "A AND T" is set based on the logical AND of the values of "A" and "T" in programmable static branch prediction bit settings 202 received with the conditional branch instruction and "NOT A" is the logical reverse of the value of "A" in programmable static branch prediction bit settings 202.

In the example, a branch prediction unit 450 reads branch instruction 426 with branch direction control bits 428 from I-cache 440. Branch prediction unit 450 includes selective branch prediction logic 452, which determines whether to set state bit 462 while branch mode setting switch 132 is set to default mode 144. In the example, if selective branch prediction logic 452 detects branch mode setting switch 132 is set to default mode 144, then selective branch prediction logic 452 determines whether branch instruction 426 is a processor-designated type of instruction qualifying for triggering static branch prediction. In another example, a decode unit 470 reads non-branch instruction 424. Decode unit 470 also includes selective branch prediction logic 452, which determines whether to set state bit 462 while branch mode setting switch 132 is set to default mode 144. In the example, if selective branch prediction logic 452 detects branch mode setting switch 132 is set to default mode 144, then selective branch prediction logic 452 determines whether non-branch instruction 424 is a processor-designated type of instruction qualifying for triggering static branch prediction. For example, selective branch prediction logic 452 determines whether non-branch instruction 424 is a lwarx instruction or whether branch instructions 426 is a special no-op instruction that are processor-designated types of instructions qualifying for triggering static branch prediction.

In the example, if selective branch prediction logic 452 detects that non-branch instruction 424 or branch instruction 426 is a processor-designated type of instruction qualifying for triggering static branch prediction and state bit 462 is not already set, branch prediction unit 450 sets state bit 462 and sets counter 464 to a value to count a threshold number; if state bit 462 is already set, branch prediction unit 450 resets the counter to count the threshold number. In the example, when state bit 462 is set to "1", branch direction logic 432 operates in static mode. In the example, counter 464 is set to decrement for each selected action detected, such as selected actions of cache lines crossed or taken branches encountered, and once counter 464 reaches zero, state bit 462 is automatically reset to "0", and branch direction logic 432 returns to operation in dynamic mode. The time spent with state bit 462 set to "1" for static mode may be counted by decrementing counter 464 to reflect a number of actions detected, such as, but not limited to, cache lines crossed or taken branches encountered, rather than by counting cycles, since threads may have different priorities and may experience long latency operations. As a result, priority or long latency operations will not knock branch prediction unit 450 from static mode to dynamic mode.

In the example, regardless of whether state bit 462 is set or is not set, as branch prediction unit 450 receives branch instruction 426 with "bit 1" of branch direction control bits 428 set to "1", branch prediction unit 450 handles branch instruction 426 by setting a predicted path to the path selected for a branch predicted taken. In the example, if the branch instruction received with "bit 1" set to "1" is an unconditional branch instruction, branch instruction 426 may be coded with an unconditional branch code, which allows branch prediction unit 450 to efficiently determine the branch location to be taken and to send the unconditional branch instruction to decode unit 470.

In the example, as branch prediction unit 450 receives branch instruction 426 with "bit 1" of branch direction control bits 428 set to "0" and "bit 2" of branch direction control bits 428 set to "1", for a conditional branch, branch prediction unit 450 dynamically predicts whether the branch will be taken or not taken for the condition in the branch instruction and sets the predicted path to the path dynamically predicted for the condition. In particular, in the example, branch prediction unit 450 attempts to avoid wasting time waiting until a conditional instruction is concluded in branch execution pipeline 480 by trying to guess whether the conditional instruction is most likely to be taken or not taken. When dynamically predicting a path, branch predictor unit 450 predicts whether a branch will be taken or not taken based on a history of whether branches are taken or not taken for one or more conditional instructions as the conditional instructions execute in real time. Over time, branch predictor unit 450 may track information about when branches are taken or not taken to uses as a basis for determining whether a branch will be taken or not taken with a current instruction. In addition, additional or alternate types of settings may guide branch predictor unit 450 in predicting whether a branch will be taken or not taken, such as the branch predictions performed by a gshare predictor, which may represent a two-level adaptive predictor with a globally shared history buffer and pattern history table, or branch predictions performed by a TAgged Geometric length predictor (TAGE) branch predictor, which relies on predictor tables indexed through independent functions of the global branch history and the branch address.

In contrast, if branch prediction unit 450 receives branch instruction 426 with "bit 1" of branch direction control bits 428 set to "0" and "bit 2" of branch direction control bits 428 set to "0", for a conditional branch, branch prediction unit 450 statically predicts the branch will not be taken and sets the predicted path to the branch not taken.

In the example, if branch mode setting switch 132 is set to default mode 144, then subsequent to branch prediction unit 450 setting predicted paths, for any conditional instructions, selective branch prediction unit 450 performs a consistency check to determine if the mode selected by the current setting of state bit 462 is consistent with the setting in branch direction control bits 428. For example, if state bit 464 is set to "0", indicating dynamic mode, then selective branch prediction unit 450 determines whether branch direction control bits 428 are consistent with dynamic mode and, if state bit 464 is set to "1", indicating static mode, then selective branch prediction unit 450 determines whether branch direction control bits 428 are consistent with static mode.

In one example, if branch prediction unit 450 detects the setting of state bit 462 and branch direction control bits 428 is consistent, then branch prediction unit 450 sets a path address for the predicted path and passes the instruction with the predicted path to decode unit 470.

In one example, if branch prediction unit 450 detects the setting of state bit 462 and branch direction control bits 428 is not consistent, then branch prediction unit 450 throws a cast out line 454 to instruction fetch address 460. The next time an attempt is made to fetch the instruction from I-cache 440, since the instruction has been cast out, this leads to an I-cache miss 442 to L2 cache 420, which prompts re-loading the line with the conditional branch instruction from L2 cache 420.

In one example, branch prediction unit 450 may determine that a setting in branch direction control bits 428 is not consistent with the mode selected by the current setting of state bit 464 because when a lwarx loop with static branch prediction settings first reached pre-decode unit 430, state bit 462 was set to "0" and branch direction control bits 428 were set for dynamic mode 312 to "01", however, once the lwarx loop reaches branch prediction unit 450, selective branch prediction logic 452 detects the lwarx instruction and sets state bit 462 to "1". As a result, the bit settings in branch direction control bits 428, set for dynamic mode, are determined to be inconsistent with the current static mode setting in state bit 462. By casting the line for the branch instruction in the lwarx loop from I-cache 440, such that the next attempt to fetch the instruction is fetched from I-cache 440 triggers I-cache miss 442, which leads to re-fetching the lwarx loop from instructions 422, then the next time branch direction logic 432 evaluates the lwarx loop is for static mode 314 and branch direction control bits 428 are set to "A AND T" and "NOT A". The next time the lwarx loop reaches branch prediction unit 450 with branch direction control bits 428 set for static mode 314, state bit 462 may still be set in static mode, if counter 464 has not decremented to zero, and selective branch prediction logic 452 will detect that the bits in branch direction control bits 428, which were set for static mode 314, are consistent with a current mode setting in state bit 462 indicating static mode. In one example, counter 464 may be set to a value that most likely will allow for the reloaded conditional branch instruction to reach branch prediction unit 450 while state bit 462 is still set.

In one example, branch prediction unit 450 may determine that a setting in branch direction control bits 428 is not consistent with the mode selected by the current setting of state bit 464 because while state bit is set to "1", pre-decode unit 430 may receive additional conditional branch instructions separate from the lwarx loop that are then set in a manner that is not consistent with running in static mode. When the additional conditional branch instructions reach branch prediction unit 450, counter 464 has finished counting and state bit 462 is returned to "0", indicating a dynamic mode. As a result, the bit settings in branch direction control bits 428, set for static mode, are determined to be inconsistent with the current dynamic mode setting in state bit 462. By casting the line for the additional branch instruction from I-cache 440, such that the next attempt to fetch the instruction is fetched from I-cache 440 triggers I-cache miss 442, which leads to re-fetching the additional branch instructions from instructions 422, then the next time branch direction logic 432 evaluates the additional branch instructions is for dynamic mode 312 and branch direction control bits 428 are set to "01". The next time the additional branch instructions reach branch prediction unit 450 with branch direction control bits 428 set for dynamic mode 312, state bit 462 may still be operating in dynamic mode, and selective branch prediction logic 452 will detect that the bits in branch direction control bits 428, which were set for dynamic mode 312, are consistent with a current mode setting in state bit 462 indicating dynamic mode.

In the example, branch prediction unit 450 sends the static or dynamic branch prediction with the branch instruction to decode unit 470. In one example, decode unit 470 fetches the path that branch prediction unit 450 determines is likely to be taken and speculatively executes the fetched path through branch execution pipeline 480. If branch prediction unit 450 later determines that the predicted path was incorrectly predicted, then branch prediction unit 450 may throw a branch mispredict flush to discard the speculatively executed or partially executed instructions and branch execution pipeline 480 starts over with a corrected branch address path, incurring a delay.

In the example, when selective branch prediction logic 452 detects non-branch instruction 424 is a processor-designated type of instruction qualifying for triggering static branch prediction, selective branch prediction logic 452 sets state bit 462 and sends cast out line 454 for the lwarx loop, to remove the line from I-cache 440. The next time the lwarx loop is received in I-cache 440, the branch instruction of the lwarx loop will include branch direction control bits set in static mode 314. For a lwarx loop, when the branch direction control bits are set in static mode 314, after state bit 462 is set for a period of time counted by counter 464, it is likely that the bits will be set to "00", with "bit 1" set to "0" so that the lwarx loop will not take a branch, but will continue to loop without the stwcx instruction speculatively executing. For example, in a lwarx loop if different processors are accessing a same line, applying static branch prediction for the lwarx loop allows multiple processors access to the same line in a more controlled way and performance overall may be improved if the locks selected in a lwarx loop are honored by applying the static branch prediction settings.

In the example, while in the embodiment illustrated one or more processor cycles may effectively be lost when selective branch prediction logic 452 determines that branch direction control bits 428 are inconsistent with the current mode setting in state bit 462, and sends cast out line 454 that casts the instructions from I-cache 440 and restarts the pre-decoding process, the processor cycles lost from an inconsistent setting and casting out of an instruction line at the branch prediction unit 450 stage is likely to be significantly less than the processor cycles or performance errors that may be incurred if the conditional branch instruction were dynamically branched from in the wrong path through branch execution pipeline 480.

In the example, if branch mode setting switch 132 is set to do not honor mode 148, branch prediction unit 450 dynamically predicts a branch taken or not taken for all conditional branch instructions, regardless of branch direction control bit settings. In the example, if branch mode setting switch 132 is set to honor static mode 152, then if branch prediction unit 450 receives a conditional branch instruction with branch direction control bits 428 set to "01", branch prediction unit 450 dynamically predicts a branch taken or not taken for the conditional branch instruction and if branch prediction unit 450 receives a conditional branch instruction with branch direction control bits 428 set to "X0", branch prediction unit 450 statically predicts a branch taken if "bit 1" is set to "1" or a branch not taken if "bit 1" is set to "0" for the conditional branch instruction.

Figures 5, 6:
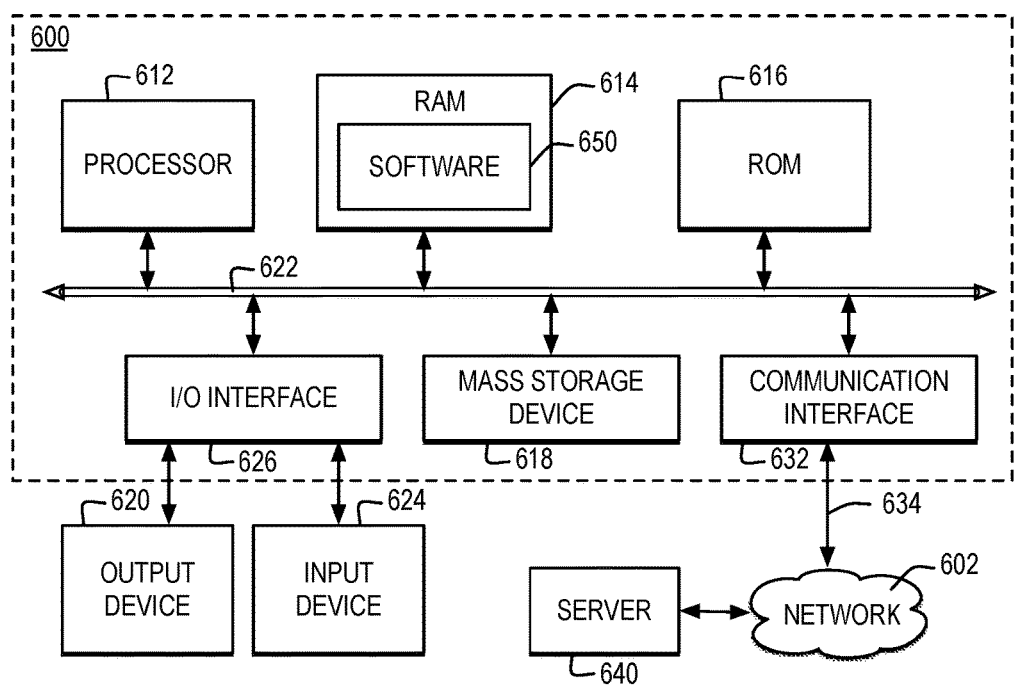
FIG. 5 is a block diagram illustrating one example of consistency check logic applied by selective branch prediction logic to determine whether the setting in branch direction control bits received with a conditional branch instruction is consistent with the mode currently selected by the state bit.
FIG. 6 is a block diagram illustrating one example of a computer system in which one embodiment of the invention may be implemented.

FIG. 5 illustrates one example of consistency check logic applied by selective branch prediction logic to determine whether the setting in branch direction control bits received with a conditional branch instruction is consistent with the mode currently selected by the state bit.

In the example, for a conditional branch 504, selective branch prediction logic 452 may determine whether a state bit 506 is consistent or inconsistent with bit 1 508, bit 2 510, and A bit 512 and determine a result 514, indicating consistent or inconsistent. In the example, A bit 512, represents a setting of the A bit 210 of programmable static branch prediction bit settings 202, which is passed with branch instruction 426, for example in a BO field.

For example with the state bit set to "0", if bit 1 and bit 2 are set to "01", the result is "consistent" as illustrated at reference numeral 520 and with the state bit set to "1", if bit 1 and bit 2 are set to "X0", with X as either 0 or 1, the result is "consistent" as illustrated at reference numeral 526. In addition, with the state bit set to "1", if bit 1 and bit 2 are set to "01" and the A bit is set to "0", the result is "consistent" as illustrated at reference numeral 528.

In contrast, with the state bit set to "0", if bit 1 and bit 2 are set to "1x" or "00", the result is "inconsistent" as illustrated at reference numerals 522 and 524 and with the state bit set to "1", if bit 1 and bit 2 are set to "11", the result is "inconsistent" as illustrated at reference numeral 532. In addition, with the state bit set to "1", if bit 1 and bit 2 are set to "01" and the A bit is set to "1", the result is "inconsistent" as illustrated at reference numeral 530.

FIG. 6 illustrates a block diagram of one example of a computer system in which one embodiment of the invention may be implemented. The present invention may be performed in a variety of systems and combinations of systems, made up of functional components, such as the functional components described with reference to a computer system 600 and may be communicatively connected to a network, such as network 602.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. In one embodiment, when implemented as a server or node, computer system 600 includes multiple processors designed to improve network servicing power.

In one embodiment, processor 612 is at least one general-purpose processor that, during normal operation, processes data under the control of software 650, which includes at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. In one embodiment, software 650 includes, but is not limited to, code, applications, protocols, interfaces, and processes for controlling one or more systems within a network including, but not limited to, an adapter, a switch, a server, a cluster system, and a grid environment.

In one embodiment, computer system 600 communicates with a remote computer, such as server 640, or a remote client. In one example, server 640 is connected to computer system 600 through any type of network, such as network 602, through a communication interface, such as network interface 632, or over a network link connected, for example, to network 602.

In one embodiment, multiple systems within a network environment are communicatively connected via network 602, which is the medium used to provide communications links between various devices and computer systems communicatively connected. Network 602 includes permanent connections such as wire or fiber optics cables and temporary connections made through telephone connections and wireless transmission connections, for example, and may include routers, switches, gateways and other hardware to enable a communication channel between the systems connected via network 602. Network 602 represents one or more of packet-switching based networks, telephony based networks, broadcast television networks, local area and wire area networks, public networks, and restricted networks.

Network 602 and the systems communicatively connected to computer 600 via network 602 implement one or more layers of one or more types of network protocol stacks which may include one or more of a physical layer, a link layer, a network layer, a transport layer, a presentation layer, and an application layer. For example, network 602 implements one or more of the Transmission Control Protocol/Internet Protocol (TCP/IP) protocol stack or an Open Systems Interconnection (OSI) protocol stack. In addition, for example, network 602 represents the worldwide collection of networks and gateways that use the TCP/IP suite of protocols to communicate with one another. Network 602 implements a secure HTTP protocol layer or other security protocol for securing communications between systems.

In the example, network interface 632 includes an adapter 634 for connecting computer system 600 to network 602 through a link and for communicatively connecting computer system 600 to server 640 or other computing systems via network 602. Although not depicted, network interface 632 may include additional software, such as device drivers, additional hardware and other controllers that enable communication. When implemented as a server, computer system 600 may include multiple communication interfaces accessible via multiple peripheral component interconnect (PCI) bus bridges connected to an input/output controller, for example. In this manner, computer system 600 allows connections to multiple clients via multiple separate ports and each port may also support multiple connections to multiple clients.

In one embodiment, the operations performed by processor 612 control the operations of flowchart of FIGS. 7-10 and other operations described herein. In one embodiment, operations performed by processor 612 are requested by software 650 or other code or the steps of one embodiment of the invention might be performed by specific hardware components that contain hardwired logic for performing the steps, or by any combination of programmed computer components and custom hardware components. In one embodiment, one or more components of computer system 600, or other components, which may be integrated into one or more components of computer system 600, contain hardwired logic for performing the operations of flowcharts in FIGS. 7-10.

In one embodiment, computer system 600 includes multiple peripheral components that facilitate input and output. These peripheral components are connected to multiple controllers, adapters, and expansion slots, such as input/output (I/O) interface 626, coupled to one of the multiple levels of bus 622. For example, input device 624 includes, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs include, for example, one or more graphical display devices, audio speakers, and tactile detectable output interfaces, but in another example also includes other output interfaces. In alternate embodiments of the present invention, additional or alternate input and output peripheral components may be added.

With respect to FIG. 6, the one or more embodiments present invention including, but are not limited to, a system, a method, and/or a computer program product. In one embodiment, the computer program product includes a computer readable storage medium (or media) having computer readable program instructions thereon for causing a processor to carry out aspects of the present invention.

In one embodiment, the computer readable storage medium is a tangible device that can retain and store instructions for use by an instruction execution device. The computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing, device.

In one embodiment, computer readable program instructions for carrying out operations of the present invention include one or more of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one example, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that in additional or alternate embodiments, the hardware depicted in FIG. 6 may vary. Furthermore, those of ordinary skill in the art will appreciate that the depicted example is not meant to imply architectural limitations with respect to the present invention.

Figure 7:
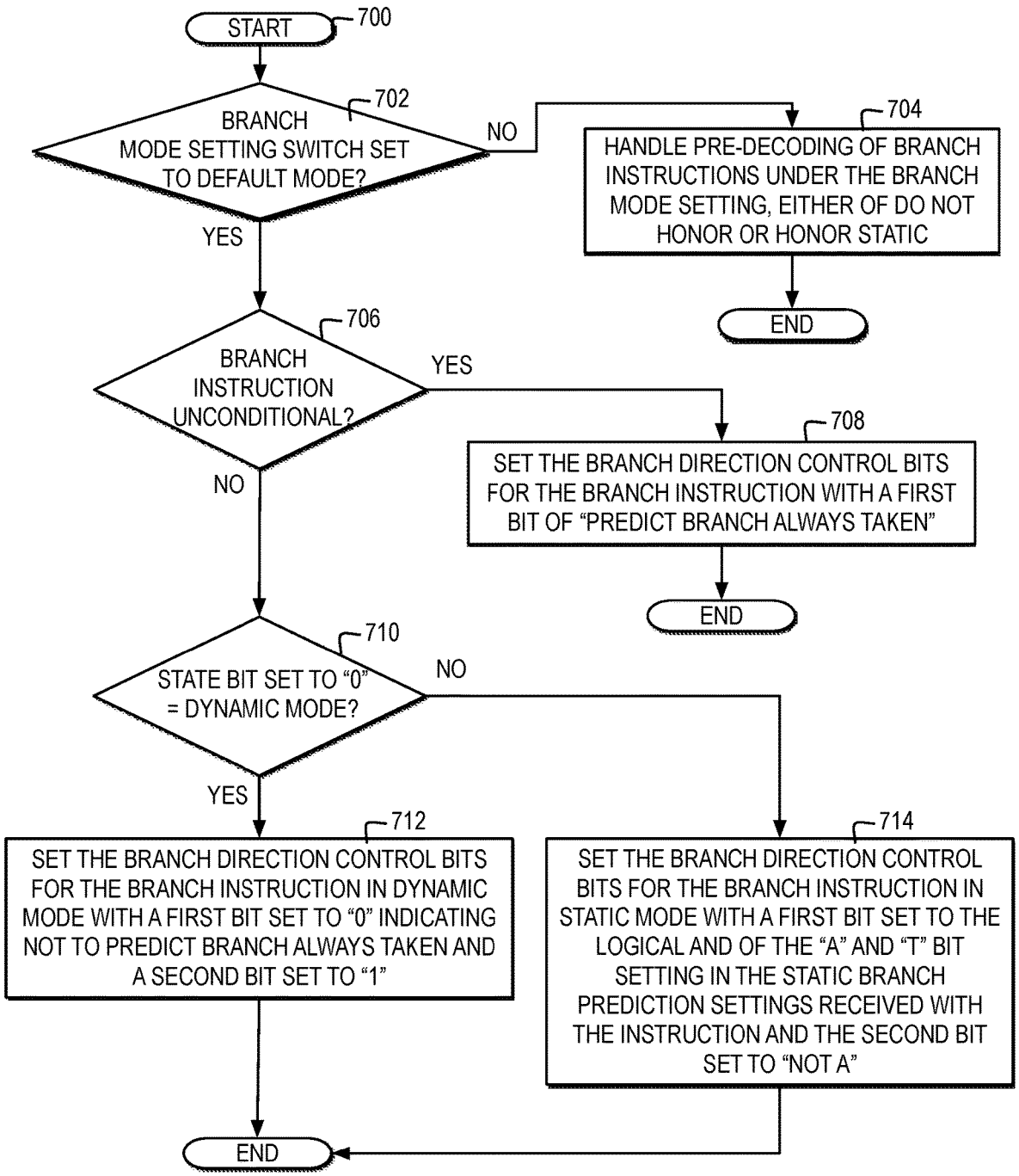
FIG. 7 is a high level logic flowchart illustrating a process and computer program for selectively supporting static branch prediction settings only for processor designated types of instructions during a pre-decoding of instructions fetched from a memory subsystem.

FIG. 7 illustrates a high level logic flowchart of a process and computer program for selectively supporting static branch prediction settings only for processor designated types of instructions during a pre-decoding of instructions fetched from a memory subsystem.

In one example, the process and program starts at block 700 and thereafter proceeds to block 702. Block 702 illustrates a determination whether a branch mode setting switch is set to a default mode.

At block 702, if a branch mode setting switch is set to a default mode, then the process passes to block 706. Block 706 illustrates a determination whether the branch instruction is coded as unconditional. At block 706, if the branch instruction is coded as unconditional, then the process passes to block 708. Block 708 illustrates setting the branch direction control bits for the branch instructions with a first bit of "predict branch always taken", and the process ends.

Returning to block 706, if the branch instruction is not coded as unconditional, then the process passes to block 710. Block 710 illustrates a determination whether a branch instruction pre-coding is detected with a state bit set to "0". At block 710, if a branch instruction pre-coding is detected with a state bit set to "0", then the process passes to block 712. Block 712 illustrates setting the branch direction control bits for the branch instruction in dynamic mode with a first bit set to "0", indicating not to predict a branch always taken, and a second bit set to "1", and the processor ends. Returning to block 710, at block 710, if a branch instruction pre-coding is detected with a state bit set to "1", then the process passes to block 714. Block 714 illustrates setting the branch direction control bits for the branch instruction in static mode with a first bit set to the logical AND of "A" and "T" bit settings in the static branch prediction settings received with the instruction, such that the first bit is set if the static branch prediction settings indicate static branch prediction is set in "A" and the statically predict branch taken is set in "T". In addition, at block 714, the second bit is set to "NOT A".

Returning to block 702, at block 702, if a branch mode setting switch is not set to a default mode, then the process passes to block 704. Block 704 illustrates handling instruction pre-decoding under the branch mode setting, either of do not honor or honor static, and the process ends.

Figure 8:
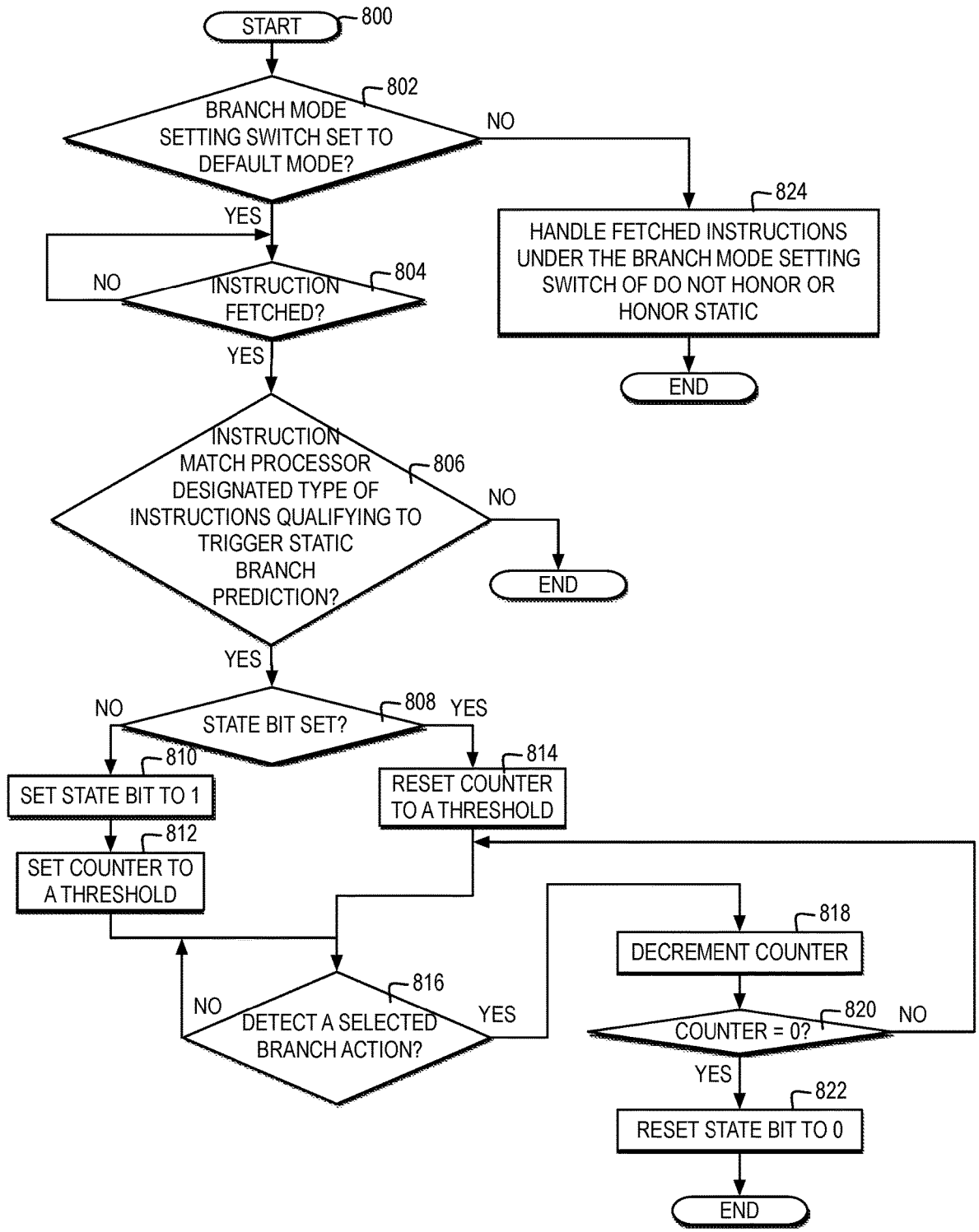
FIG. 8 is a high level logic flowchart of a process and computer program for a selective branch prediction logic selectively setting a processor from a dynamic mode to a static mode, for a threshold number of detected actions, in response to detecting a processor designated type of instructions qualifying for triggering static branch prediction.

FIG. 8 illustrates a high level logic flowchart of a process and computer program for a selective branch prediction logic selectively setting a processor from a dynamic mode to a static mode, for a threshold number of detected actions, in response to detecting a processor designated type of instructions qualifying for triggering static branch prediction.

In one example, the process and program starts at block 800 and thereafter proceeds to block 802. Block 802 illustrates a determination whether a branch mode setting switch is set to a default mode. At block 802, if a branch mode setting switch is set to a default mode, then the process passes to block 804. Block 804 illustrates a determination whether the instruction is fetched. At block 804, if the instruction is fetched, then the process passes to block 806. Block 806 illustrates a determination whether the instruction matches a processor designated type of instructions qualifying to trigger static branch prediction. At block 806, if the instruction does not match a processor designated type of instructions qualifying to trigger static branch prediction, then the process ends.

At block 806, if the instruction matches a processor designated type of instructions qualifying to trigger static branch prediction, then the process passes to block 808. Block 808 illustrates a determination whether a state bit is set. At block 808, if a state bit is already set, then the process passes to block 814. Block 814 illustrates resetting a counter to a threshold, and the passes to block 816. Returning to block 808, if a state bit is not already set, then the process passes to block 810. Block 810 illustrates setting a state bit to "1", indicating a static mode is set. Next, block 812 illustrates setting a counter to a threshold, and the process passes to block 816.

At block 816, if the selective branch prediction logic detects the branch prediction unit take selected actions, such as cross line boundaries or predict branches as taken, then the process passes to block 818. Block 818 illustrates decrementing the counter. Next, block 820 illustrates a determination whether the counter reaches "0". At block 820, if the counter reaches "0", then then the process passes to block 822. Block 822 illustrates resetting the state bit to "0", and the process ends.

Returning to block 802, at block 802, if a branch mode setting switch is not set to a default mode, then the process passes to block 824. Block 824 illustrates handling fetched instructions under the selected branch mode setting switch of do not honor or honor static.

Figure 9:
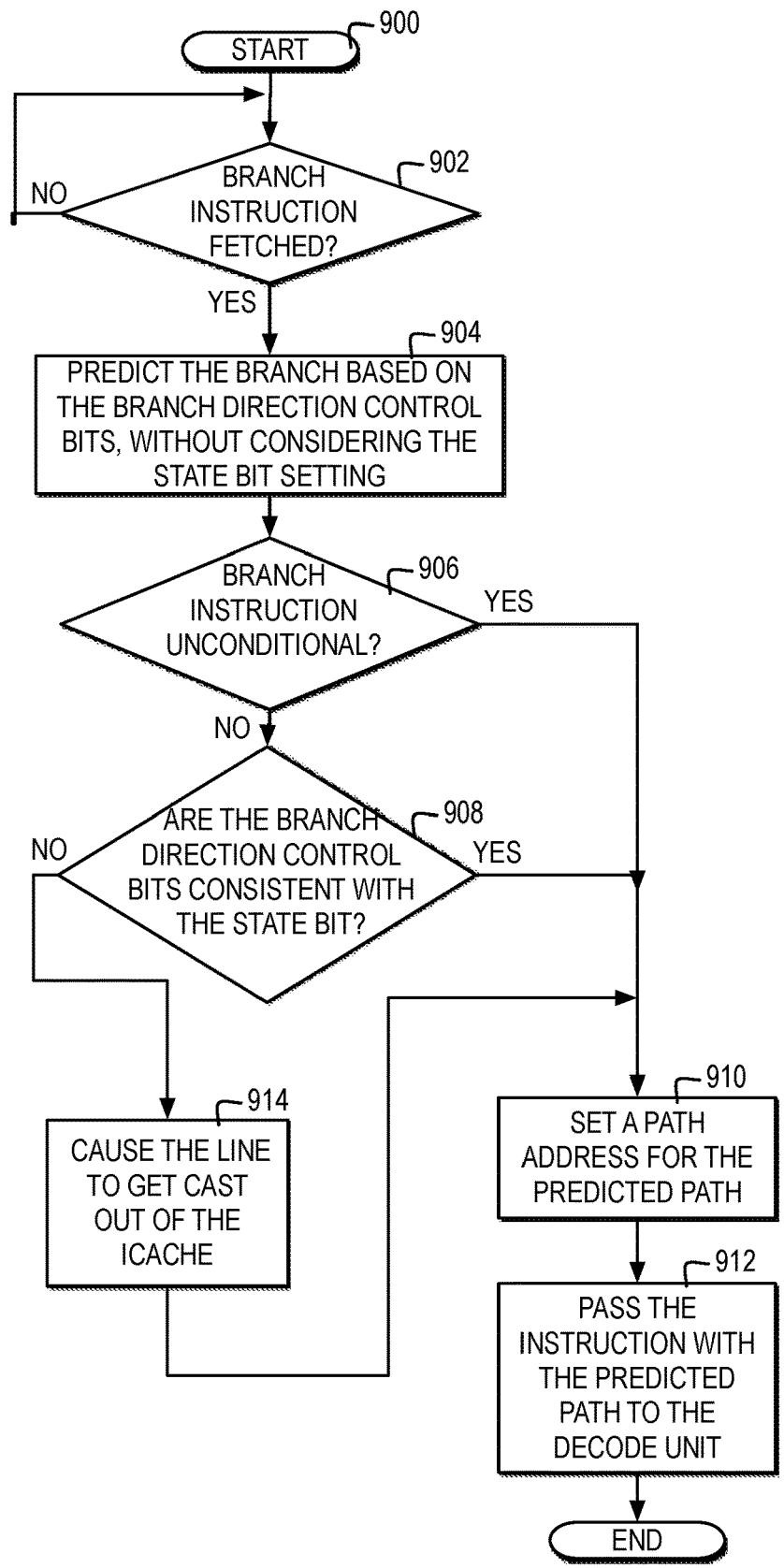
FIG. 9 is a high level logic flowchart illustrating a process and computer program for a branch prediction unit selectively determining whether to cause a branch prediction to be cast out of the I-cache in response to detecting that the branch direction control bits received are inconsistent with a currently set mode of a dynamic mode or a static mode.

FIG. 9 illustrates a high level logic flowchart of a process and computer program for a branch prediction unit selectively determining whether to cause a branch prediction to be cast out of the I-cache in response to detecting that the branch direction control bits received are inconsistent with a currently set mode of a dynamic mode or a static mode.

In one example, the process and program starts at block 900 and thereafter proceeds to block 902. Block 902 illustrates a determination whether a branch instruction is fetched. At block 902, if a branch instruction is fetched, then the process passes to block 904. Block 904 illustrates predicting the branch based on the branch direction control bits, without considering the state bit setting. Next, block 906 illustrates a determination whether a branch instruction is coded as unconditional. At block 906, if the branch instruction is coded as unconditional, then the process passes to block 910. Otherwise, at block 906, if the branch instruction is not coded as unconditional, then the process passes to block 908. Block 908 illustrates a determination whether the branch direction control bits are consistent with the state bit.

At block 908, if the branch direction control bits are not consistent with the state bit, whether the branch direction control bits were originally set while in a dynamic mode and the state bit in now set to static mode or the branch direction control bits were originally set in a static mode and the state bit is now set to a dynamic mode, then the process passes to block 912. Block 912 illustrates causing the line to get cast out of the I-cache, and the process passes to block 910.

At block 908, if the branch direction control bits are consistent with the state bit, then the process passes to block 910. Block 910 illustrates setting a path address for the predicted path. Next, block 912 illustrates passing the instruction with the predicted path to the decode unit, and the process ends.

Figure 10:
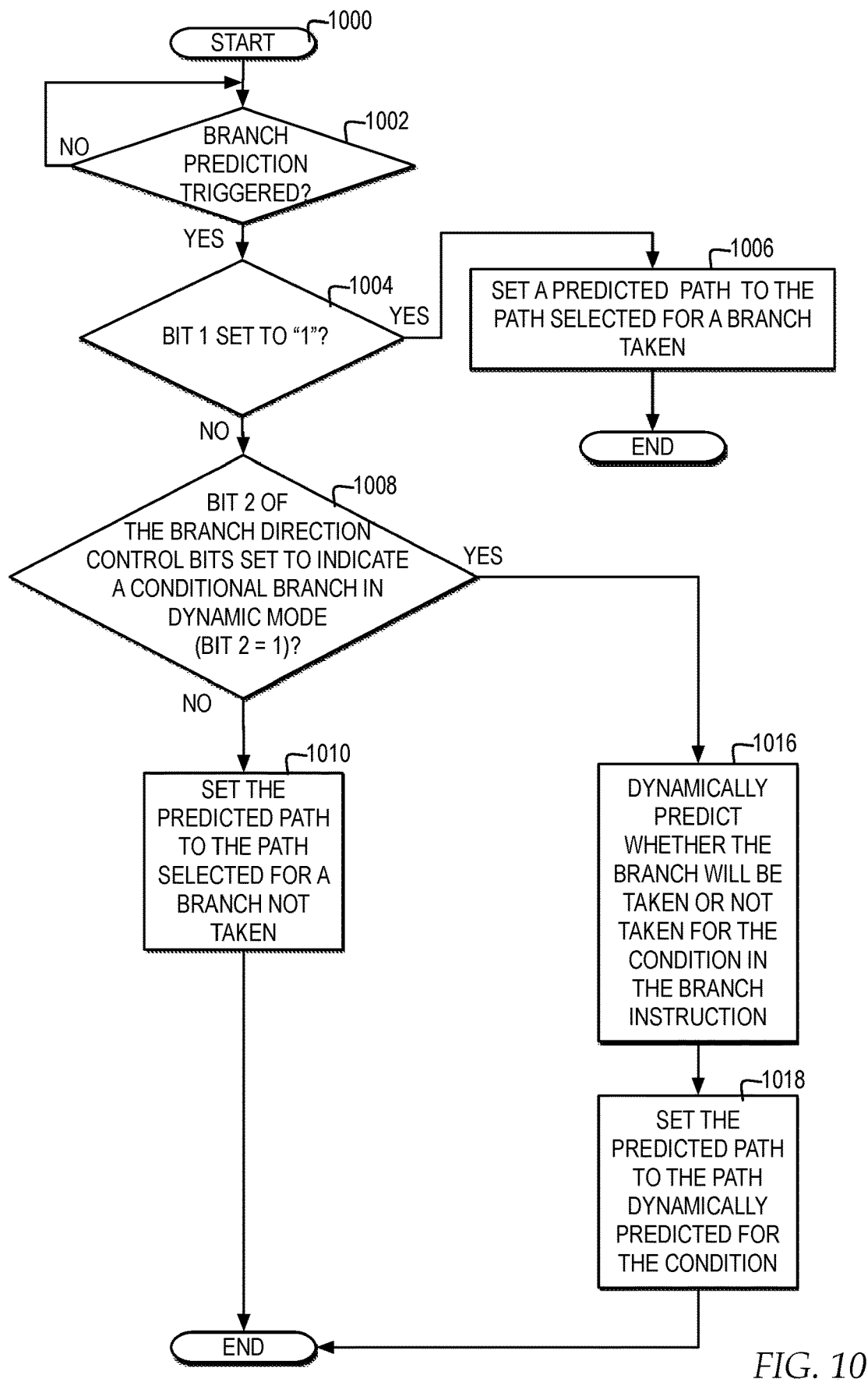
FIG. 10 is a high level logic flowchart of a process and computer program for a branch prediction unit for setting a predicted branch path for a conditional branch instruction based on branch direction control bit settings.

FIG. 10 illustrates a high level logic flowchart of a process and computer program for a branch prediction unit for setting a predicted branch path for a conditional branch instruction based on branch direction control bit settings.

In the example, the process and program starts at block 1000 and thereafter proceeds to block 1002. Block 1002 illustrates a determination whether a branch prediction is triggered, such as at block 904 of FIG. 9. At block 1002, if a branch prediction is triggered, then the process passes to block 1004. Block 1004 illustrates a determination whether "bit 1" is set to "1". At block 1004, if "bit 1" is set to "1", then the process passes to block 1006. Block 1006 illustrates setting a predicted path to the path selected for a branch taken, and the process ends.

At block 1004, if the branch instruction is not unconditional, then the process passes to block 1008. Block 1008 illustrates a determination whether "bit 2" of the branch direction control bits is set to indicate a conditional branch in dynamic mode ("bit 2"="1").

At block 1008, if "bit 2" of the branch direction control bits is not set to indicate a conditional branch in dynamic mode, then the process passes to block 1010. Block 1010 illustrates setting the predicted path to the path selected for a branch not taken, and the process ends.

At block 1008, if "bit 2" of the branch direction control bits is set to indicate a conditional branch in dynamic mode, then the process passes to block 1016. Block 1016 illustrates dynamically predicting whether the branch will or will not be taken for the condition in the branch instruction. Next, block 1018 illustrates setting the predicted path to the path dynamically predicted for the condition, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The foregoing description is just an example of embodiments of the invention, and variations and substitutions. While the invention has been particularly shown and described with reference to one or more embodiments, it will be understood by those skilled in the art that various changes in form and detail may be made therein without departing from the spirit and scope of the invention.

What is claimed is:

1. A processor comprising:
   a branch prediction mechanism of the processor reading at least one instruction from a memory subsystem, the at least one instruction comprising one of a branch instruction and a non-branch instruction, the at least one instruction initially received by an instruction fetch unit of the processor with static branch prediction setting bits with a primary bit indicating whether a branch should be statically predicted and a secondary bit indicating whether to predict the branch as taking a branch path from among two paths of the branch, wherein a pre-decode unit of the instruction fetch unit recodes the branch instruction with branch direction control bits, wherein the pre-decode unit recodes the branch direction control bits based on the static branch prediction setting bits only in response to an instruction fetch unit of the processor set to operate in a static mode;
   the branch prediction mechanism, in response to the instruction fetch unit set to operate in a dynamic mode and the branch instruction comprising a conditional branch instruction, dynamically predicting the branch path as taken or not taken from among two paths of the conditional branch instruction based on the branch direction control bits set for the dynamic mode;
   the branch prediction mechanism, in response to the instruction fetch unit set to operate in the static mode, the branch instruction comprising the conditional branch instruction, and a second bit of the branch direction control bits set to specify static prediction based on the primary bit, statically setting the branch path as taken or not taken according to a first bit of the branch direction control bits set based on the primary bit and the secondary bit of the static branch prediction setting bits; and
   the branch prediction mechanism selectively setting an operation of the processor temporarily from the dynamic mode to the static mode only in response to detecting a type of the at least one instruction matches a type of instruction qualifying to trigger static branch prediction.

2. The processor according to claim 1, further comprising:
   the branch prediction mechanism, in response to detecting a type of a recoded instruction matches the type of instruction qualifying to trigger static branch prediction and detecting the processor is set to operate in a mode for dynamically honoring the static branch prediction setting bits bit settings, determining whether a state bit is set to the static mode;

the branch prediction mechanism, in response to determining the state bit is set to the static mode, resetting a counter to a threshold number;

the branch prediction mechanism, in response to determining the state bit is not already set to the static mode, setting the state bit to set the operation of the processor to the static mode and setting the counter to the threshold number;

the branch prediction mechanism decrementing the counter from the threshold number for each selected branch action detected comprising at least one of a cache line crossed or a taken branch encountered by a branch prediction unit; and the branch prediction mechanism, in response to the counter reaching zero, automatically returning the operation of the instruction fetch unit from the static mode to the dynamic mode.

3. The processor according to claim 1, further comprising:

the branch prediction mechanism detecting a branch prediction unit fetch and the branch instruction matching the type of instruction qualifying to trigger static branch prediction, wherein a recoded instruction comprises a no operation branch instruction.

4. The processor according to claim 1, further comprising:

the branch prediction mechanism detecting, in a decode unit of the instruction fetch unit, fetch of a recoded instruction matching the type of instruction qualifying to trigger static branch prediction, wherein the recoded instruction comprises a load word and reserved index instruction.

5. The processor of claim 1, further comprising:

the pre-decode unit selectively recoding the branch direction control bits for the conditional branch instruction according to the static branch prediction setting bits received with the branch instruction by performing a logical AND operation on the primary bit and the secondary bit, setting the first bit of the branch direction control bits to a first result of the logical AND operation, performing a logical NOT operation on the primary bit, and setting the second bit of the branch direction control bits to a second result of the logical NOT operation.

6. A processor, comprising:

an instruction fetch unit of a plurality of functional units of the processor;

a pre-decode unit of the instruction fetch unit reading at least one instruction from a memory subsystem, the at least one instruction comprising static branch prediction setting bits comprising a primary bit indicating whether a branch should be statically predicted and a secondary bit indicating whether to predict the branch as taking a branch path from among two paths of the branch;

the pre-decode unit selectively recoding each at least one instruction, wherein selectively recoding each at least one instruction comprising a branch instruction comprises adding branch direction control bits specifying handling of the branch instruction by a branch prediction unit of the instruction fetch unit;

in response to the pre-decode unit operating in a dynamic mode from among a static mode and a dynamic mode and the branch instruction comprising a conditional branch instruction, the pre-decode unit selectively recoding the branch direction control bits for the conditional branch instruction by setting a first bit of the branch direction control bits to indicate to not predict the conditional branch instruction as always taken from among two paths of the conditional branch instruction and setting a second bit of the branch direction control bits to indicate the conditional branch instruction is designated for dynamic prediction;

in response to the pre-decode unit operating in the static mode and the branch instruction comprising the conditional branch instruction, the pre-decode unit selectively recoding the branch direction control bits for the conditional branch instruction according to the static branch prediction setting bits received with the branch instruction by performing a logical AND operation on the primary bit and the secondary bit, setting the first bit of the branch direction control bits to a first result of the logical AND operation, performing a logical NOT operation on the primary bit, and setting the second bit of the branch direction control bits to a second result of the logical NOT operation; and selective branch prediction logic of the instruction fetch unit selectively setting an operation of the processor temporarily from the dynamic mode to the static mode, only in response to fetching the at least one instruction and detecting a type of the recoded instruction matches a type of instruction qualifying to trigger static branch prediction.

7. The processor according to claim 6, wherein the pre-decode unit selectively recodes the branch direction control bits for the conditional branch instruction according to the static branch prediction setting bits received with the conditional branch instruction only in response to the pre-decode unit operating in the static mode.

8. The processor according to claim 6, further comprising:

the selective branch prediction logic, in response to fetching the at least one instruction, detecting the type of the recoded instruction matches the type of instruction qualifying to trigger static branch prediction, and detecting the processor is set to operate in a mode for dynamically honoring the static branch prediction setting bits, determining whether a state bit is set to the static mode;

the selective branch prediction logic, in response to determining the state bit is set to the static mode, resetting a counter to a threshold number, wherein the counter decrements for each selected branch action detected; and the selective branch prediction logic, in response to determining the state bit is not already set to the static mode, setting the state bit to set the operation of the processor to the static mode and setting the counter to the threshold number.

9. The processor according to claim 8, further comprising:

the selective branch prediction logic decrementing the counter from the threshold number for each selected branch action detected comprising at least one of a cache line crossed or a taken branch encountered by the branch prediction unit; and the selective branch prediction logic, in response to the counter decrementing to zero, automatically returning the operation of the processor from the static mode to the dynamic mode.

10. The processor according to claim 8, further comprising:

the selective branch prediction logic detecting a branch prediction unit fetch, from an instruction cache, and the recoded instruction matching the type of instruction qualifying to trigger static branch prediction, wherein the recoded instruction comprises a no operation branch instruction.

11. The processor according to claim 8, further comprising:
the selective branch prediction logic detecting, in a decode unit of the instruction fetch unit, a fetch, from an instruction cache, of the recoded instruction matching the type of instruction qualifying to trigger static branch prediction, wherein the recoded instruction comprises a load word and reserved index instruction.

12. A method, comprising:
reading, by a pre-decode unit of an instruction fetch unit of a plurality of functional units of a processor, at least one instruction from a memory subsystem, the at least one instruction comprising static branch prediction setting bits comprising a primary bit indicating whether a branch should be statically predicted and a secondary bit indicating whether to predict the branch as taking a branch path from among two paths of the branch;
selectively recoding, by the pre-decode unit, each at least one instruction, wherein selectively recoding each at least one instruction comprising a branch instruction comprises adding branch direction control bits specifying handling of the branch instruction by a branch prediction unit of the instruction fetch unit;
in response to the pre-decode unit operating in a dynamic mode from among a static mode and the dynamic mode and the branch instruction comprising a conditional branch instruction, selectively recoding, by the pre-decode unit, the branch direction control bits for the conditional branch instruction by setting a first bit of the branch direction control bits to indicate to not predict the conditional branch instruction as always taken from among two paths of the conditional branch instruction and setting a second bit of the branch direction control bits to indicate the conditional branch instruction is designated for dynamic prediction;
in response to the pre-decode unit operating in the static mode and the branch instruction comprising the conditional branch instruction, selectively recoding, by the pre-decode unit, the branch direction control bits for the conditional branch instruction according to the static branch prediction setting bits received with the branch instruction by performing a logical AND operation on the primary bit and the secondary bit, setting the first bit of the branch direction control bits to a first result of the logical AND operation, performing a logical NOT operation on the primary bit, and setting the second bit of the branch direction control bits to a second result of the logical NOT operation; and
selectively setting, by selective branch prediction logic of the instruction fetch unit, an operation of the processor temporarily from the dynamic mode to the static mode, only in response to fetching the at least one instruction and detecting a type of the recoded instruction matches a type of instruction qualifying to trigger static branch prediction.

13. The method according to claim 12, further comprising:
selectively recoding, by the pre-decode unit, the branch direction control bits for the conditional branch instruction according to the static branch prediction setting bits received with the conditional branch instruction only in response to the pre-decode unit operating in the static mode.

14. The method according to claim 12, further comprising:
in response to fetching the at least one instruction, detecting, by the selective branch prediction logic, the type of the recoded instruction matches the type of instruction qualifying to trigger static branch prediction, and detecting the processor is set to operate in a mode for dynamically honoring the static branch prediction setting bits, determining whether a state bit is set to the static mode;
in response to determining the state bit is set to the static mode, resetting, by the selective branch prediction logic, a counter to a threshold number, wherein the counter decrements for each selected branch action detected; and
in response to determining the state bit is not already set to the static mode, setting, by the selective branch prediction logic, the state bit to set the operation of the processor to the static mode and setting the counter to the threshold number.

15. The method according to claim 14, further comprising:
decrementing, by the selective branch prediction logic, the counter from the threshold number for each selected branch action detected comprising at least one of a cache line crossed or a taken branch encountered by the branch prediction unit; and
in response to the counter decrementing to zero, automatically returning, by the selective branch prediction logic, the operation of the processor from the static mode to the dynamic mode.

16. The method according to claim 14, further comprising:
detecting, by the selective branch prediction logic, a branch prediction unit fetch, from an instruction cache, and the recoded instruction matching the type of instruction qualifying to trigger static branch prediction, wherein the recoded instruction comprises a no operation branch instruction.

17. The method according to claim 14, further comprising:
detecting, by the selective branch prediction logic, in a decode unit, of the instruction fetch unit, a fetch, from an instruction cache, of the recoded instruction matching the type of instruction qualifying to trigger static branch prediction, wherein the recoded instruction comprises a load word and reserved index instruction.

* * * * *